United States Patent
Zang

(10) Patent No.: US 12,541,622 B2
(45) Date of Patent: Feb. 3, 2026

(54) METHOD AND APPARATUS FOR DATA CONSISTENCY DETECTION AND REPAIR, AND MEDIUM

(71) Applicant: SUZHOU METABRAIN INTELLIGENT TECHNOLOGY CO., LTD., Jiangsu (CN)

(72) Inventor: Linjie Zang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 66 days.

(21) Appl. No.: 18/718,148

(22) PCT Filed: Nov. 29, 2022

(86) PCT No.: PCT/CN2022/135108
§ 371 (c)(1),
(2) Date: Jun. 10, 2024

(87) PCT Pub. No.: WO2023/179077
PCT Pub. Date: Sep. 28, 2023

(65) Prior Publication Data
US 2025/0061235 A1 Feb. 20, 2025

(30) Foreign Application Priority Data
Mar. 25, 2022 (CN) .......................... 202210298447.6

(51) Int. Cl.
*G06F 21/64* (2013.01)
*H04L 67/1095* (2022.01)
*H04L 67/1097* (2022.01)

(52) U.S. Cl.
CPC .......... *G06F 21/64* (2013.01); *H04L 67/1095* (2013.01); *H04L 67/1097* (2013.01)

(58) Field of Classification Search
CPC ..... G06F 21/64; G06F 16/16; H04L 67/1095; H04L 67/1097
See application file for complete search history.

(56) References Cited

U.S. PATENT DOCUMENTS

| 2016/0330281 A1* | 11/2016 | Narayanan | .......... H04L 67/1095 |
| 2017/0344597 A1* | 11/2017 | Wang | .................... G06F 16/182 |
| 2017/0364550 A1* | 12/2017 | Pazos | ...................... H04L 67/51 |

FOREIGN PATENT DOCUMENTS

| CN | 104111937 A | * 10/2014 | .......... G06F 11/1469 |
| CN | 105160253 A | 12/2015 | |

(Continued)

OTHER PUBLICATIONS

International Search report for PCT/CN2022/135108 mailed on Feb. 13, 2023.

*Primary Examiner* — Harunur Rashid
(74) *Attorney, Agent, or Firm* — Dennemeyer & Associates LLC

(57) ABSTRACT

This present disclosure discloses a method and apparatus for data consistency detection and repair, and a non-transitory computer-readable storage medium, related to the technical field of storage. In the method, consistency detection is performed on files; and when it is detected that the files are inconsistent, the files are repaired. In the repair process, data objects of a file to be repaired are acquired, and data objects to be repaired is determined; and the data objects to be repaired are then repaired according to copy data corresponding to the data objects. Hence, in the method, check information does not need to be attached to the entire IO path during implementation of data consistency, and therefore it is easier to implement data consistency; next, it is first determined whether files are consistent, then only a file to be repaired is divided into a plurality of data objects, and files satisfying data consistency do not need to be divided into a (Continued)

plurality of data objects, thereby reducing the time for determining a data object to be repaired, simplifying the process of data consistency detection and repair, and improving the efficiency of data consistency detection and repair.

14 Claims, 3 Drawing Sheets

(56) References Cited

FOREIGN PATENT DOCUMENTS

| | | | |
|---|---|---|---|
| CN | 107948334 A | 4/2018 |
| CN | 112463444 A | 3/2021 |
| CN | 113806119 A | 12/2021 |
| CN | 114416665 A | 4/2022 |

\* cited by examiner

METHOD AND APPARATUS FOR DATA CONSISTENCY DETECTION AND REPAIR, AND MEDIUM

CROSS-REFERENCE TO RELATED

This is a 35 U.S.C. 371 National Stage Patent Application of International Application No. PCT/CN2022/135108, filed Nov. 29, 2022, which claims priority to Chinese application 202210298447.6, filed Mar. 25, 2022, each of which is hereby incorporated by reference in its entirety.

CROSS-REFERENCE TO RELATED APPLICATION

The present disclosure claims priority to Chinese Patent Application No. 202210298447.6, filed before the China National Intellectual Property Administration (CNIPA) on Mar. 25, 2022 and entitled "Method and Apparatus for Data Consistency Detection and Repair, and Medium", which is incorporated herein by reference in its entirety.

TECHNICAL FIELD

The present disclosure relates to the technical field of storage, and in particular, to a method and apparatus for data consistency detection and repair, and a non-transitory computer-readable storage medium.

BACKGROUND

With cloud computing and digital transformation, the amount of data generated grows exponentially, and therefore new technical requirements are imposed on massive data storage. In order to satisfy the requirements of massive data storage, a distributed storage technology emerges in the background of the current technology. However, the architecture of a distributed storage system is complex. When there are more cluster nodes, the probability of different cluster nodes being faulty is higher. Factors causing data damage mainly contain hardware errors, wherein the hardware contains, such as a memory, a Central Processing Unit (CPU), and a network card; signal noise interference in a data transmission process, such as an Serial Advanced Technology Attachment (SATA) hard disk protocol, and a Fiber Channel (FC) protocol; firmware issues, wherein the firmware contains, such as Redundant Arrays of Independent Disks (RAID) controllers, and disk controllers; software issues, such as operating system kernel issues, local file system issues, network system issues, general block layer issues, and Input/Output (IO) scheduling layer issues; and operation and maintenance factors, when an extreme situation occurs, a maintenance operation performed on a distributed system being incorrect.

All of the factors above may cause data damage, which results in inconsistency of data in a distributed cluster system, service IO errors, and data unavailability, thereby reducing data reliability. Currently, end-to-end data check is generally used to implement data consistency. However, check information needs to be attached to the entire IO path. Since it is difficult to attach check information to the entire IO path, the process of implementing data consistency is relatively complex.

Hence, how to perform consistency detection and repair on data is a problem to be urgently solved by a person skilled in the art.

SUMMARY

An object of some embodiments of the present disclosure is to provide a method and apparatus for data consistency detection and repair, and a non-transitory computer-readable storage medium, which are used for performing consistency detection and repair on data.

In order to solve the described technical problem, some embodiments of the present disclosure provide a method for data consistency detection and repair, comprising:
acquiring a current file and an original file corresponding to the current file;
comparing the current file with the original file, so as to determine whether the current file is consistent with the original file;
determining, when the current file is inconsistent with the original file, that the current file is a file to be repaired; acquiring data objects of the file to be repaired; comparing the data objects of the file to be repaired with data objects of the original file, so as to determine a data object to be repaired; and repairing, according to copy data of the data objects of the original file, the data object to be repaired, and returning to the operation of acquiring the current file and the original file corresponding to the current file; and
ending the process when the current file is consistent with the original file.

Optionally, comparing the current file with the original file, so as to determine whether the current file is consistent with the original file contains:
acquiring a first MD5 value of the original file and acquiring a second MD5 value of the current file; and
proceeding, when the first MD5 value is different from the second MD5 value, to the operation of determining that the current file is a file to be repaired.

Optionally, acquiring data objects of the file to be repaired contains:
acquiring the size of the file to be repaired, and setting the size of each of the data objects to be a preset value;
dividing the file to be repaired into a plurality of data objects according to the size of the file to be repaired and the preset value; and
acquiring the plurality of data objects of the file to be repaired.

Optionally, the method for data consistency detection and repair further contains storing the original file in a storage pool, wherein storing the original file in a storage pool contains:
dividing the original file into a plurality of data objects and acquiring the data objects of the original file;
setting placement groups (PGs) in the storage pool;
storing the data objects of the original file in the PGs; and
mapping the PGs to OSD disks of the storage pool by means of a crushmap algorithm, wherein the OSD disks of the storage pool contain multiple copy data mapped by the PGs.

Optionally, repairing, when it is detected that data inconsistency is caused by xattr extension attribute loss, according to copy data of the data objects of the original file, the data object to be repaired contains:
querying, according to mapping information of the PGs in the OSD disks of the storage pool, a copy number of the data object to be repaired;
acquiring copy data mapped by the PG corresponding to the data object to be repaired, wherein the copy data mapped by the PG is the copy data of the data objects of the original file;

copying the copy data mapped by the PG to a node corresponding to the data object to be repaired;

modifying a header part of an xattr file to the copy number of the data object to be repaired; and restoring the data object to be repaired, so as to complete data repair.

Optionally, after repairing, according to copy data of the data objects of the original file, the data object to be repaired, the method further contains:

setting up an automated repair tool; and adding the automated repair tool to a backend task.

Optionally, after repairing, according to the copy data corresponding to the data object to be repaired, the data object to be repaired, the method further contains:

outputting information for prompting repair completion.

In order to solve the described technical problem, some embodiments of the present disclosure further provide an apparatus for data consistency detection and repair, comprising:

a first acquisition module, configured to acquire a current file and an original file corresponding to the current file;

a first comparison module, configured to compare the current file with the original file, so as to determine whether the current file is consistent with the original file; when the current file is inconsistent with the original file, trigger a determination module; and when the current file is consistent with the original file, end the process;

the determination module, configured to determine that the current file is a file to be repaired;

a second acquisition module, configured to acquire data objects of the file to be repaired;

a second comparison module, configured to compare the data objects of the file to be repaired with data objects of the original file, so as to determine a data object to be repaired; and a repair module, configured to repair, according to copy data of the data objects of the original file, the data object to be repaired, and return to the operation of acquiring the current file and the original file corresponding to the current file.

In order to solve the described technical problem, some embodiments of the present disclosure further provide an apparatus for data consistency detection and repair, comprising:

a memory, configured to store a computer program; and a processor, configured to execute the computer program to implement the operations of the method for data consistency detection and repair.

In order to solve the described technical problem, some embodiments of the present disclosure further provide non-transitory computer-readable storage medium, wherein the computer-readable storage medium stores a computer program which, when being executed by a processor, implements the operations of the method for data consistency detection and repair.

Some embodiments of the present disclosure provide a method for data consistency detection and repair. The method contains: acquiring a current file and an original file corresponding to the current file; comparing the current file with the original file, so as to determine whether the current file is consistent with the original file; determining, when the current file is inconsistent with the original file, that the current file is a file to be repaired; acquiring data objects of the file to be repaired; comparing the data objects of the file to be repaired with data objects of the original file, so as to determine a data object to be repaired; and repairing, according to copy data of the data objects of the original file, the data object to be repaired, and returning to the operation of acquiring the current file and the original file corresponding to the current file; and ending the process when the current file is consistent with the original file. Hence, compared with the current method for implementing data consistency by means of end-to-end data check, in the method according to some embodiments of the present disclosure, check information does not need to be attached to the entire IO path during implementation of data consistency, and therefore it is easier to implement data consistency; next, compared with a method for directly dividing files into a plurality of data objects, in the method, it is first determined whether files are consistent, then only a file to be repaired is divided into a plurality of data objects, and files satisfying data consistency do not need to be divided into a plurality of data objects, thereby reducing the time for determining a data object to be repaired, simplifying the process of data consistency detection and repair, and improving the efficiency of data consistency detection and repair.

In addition, some embodiments of the present disclosure further provide an apparatus for data consistency detection and repair, and a non-transitory computer-readable storage medium, which correspond to the described method for data consistency detection and repair, and the effect is the same as above.

BRIEF DESCRIPTION OF THE DRAWINGS

In order to describe the embodiments of the present disclosure more clearly, hereinafter, accompanying drawings requiring to be used in the embodiments are introduced briefly. Apparently, the accompanying drawings in the following description merely relate to some embodiments of the present disclosure, and for a person of ordinary skill in the art, other embodiments may also be derived from these accompanying drawings without involving any inventive effort.

DETAILED DESCRIPTION OF THE EMBODIMENTS

Hereinafter, the technical solutions in the embodiments of the present disclosure will be described clearly and completely with reference to the accompanying drawings of the embodiments of the present disclosure. Obviously, the embodiments as described are only some of the embodiments of the present disclosure, and are not all of the embodiments. All other embodiments obtained by a person of ordinary skill in the art on the basis of the embodiments of the present disclosure without involving any inventive effort all fall within the scope of protection of the present disclosure.

The core of some embodiments of the present disclosure is to provide a method and apparatus for data consistency detection and repair, and a non-transitory computer-readable storage medium, which are used for performing consistency detection and repair on data.

With cloud computing and digital transformation, the amount of data generated grows exponentially, and therefore new technical requirements are imposed on massive data storage. Although traditional storage has advantages such as mature technology, good performance and high availability, its disadvantages become more and more apparent when faced with massive data, such as poor expansibility, high cost, existence of a single point of failure and performance bottleneck. In order to overcome the described disadvantages and satisfy the requirements of massive data storage, a distributed storage technology emerges in the background of the current technology. A distributed storage system generally contains a storage server and a plurality of clients, and the nature of the distributed storage system is to evenly distribute a large number of files to a plurality of storage servers. The distributed storage system has been widely applied in a generation environment, and has the characteristics of high expandability, high availability and high reliability. Meanwhile, a distributed object storage system may be applied to a plurality of scenarios, and under the promotion of a commercial mode, the requirements for data reliability of the distributed storage system is higher and higher.

Figure 1:
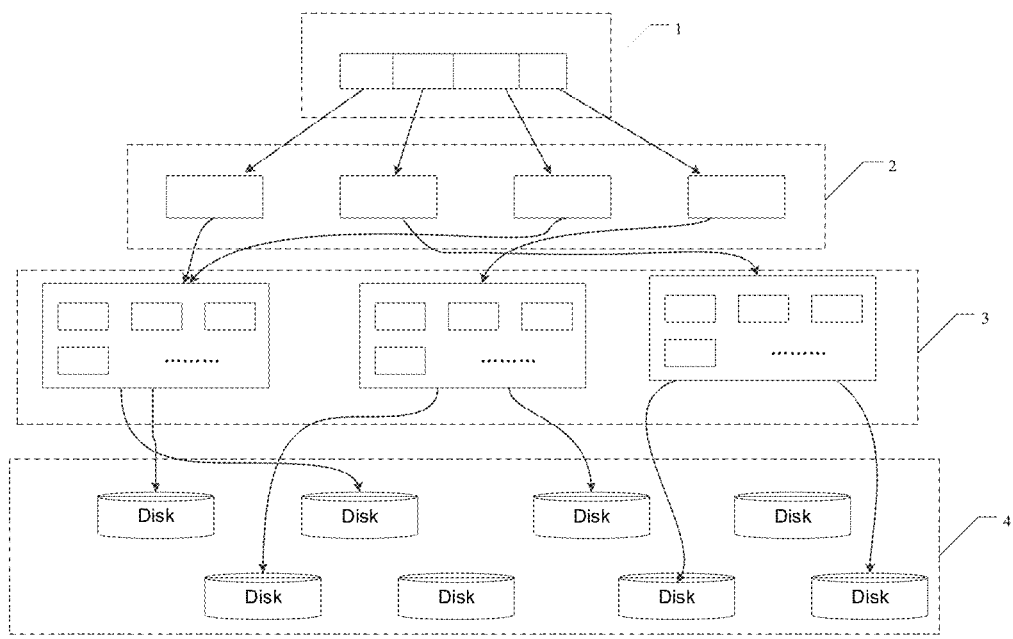
FIG. 1 is a flowchart of data storage based on a distributed storage system provided according to embodiments of the present disclosure.

FIG. 1 is a flowchart of data storage based on a distributed storage system provided according to embodiments of the present disclosure. As shown in FIG. 1, the distributed storage system mainly contains: file data 1, data objects 2, PGs (Placement groups) 3 and disks 4, wherein the data object 2, the PGs 3 and the disks 4 are stored in a storage pool. A client of the distributed storage system stores the file data to be stored in the underlaying disks 4 as object instances. The disks 4 are a daemon of data storage of the distributed storage system, and the role of the daemon of the disks 4 is to process IO operations on a storage device. After the file data 1 is fragmented into the data objects 2, the distributed storage system is designed with PGs 3 to effectively manage massive data objects 2, and the PGs 3 are mapped to the disks 4. As the amount of data increases, in the process of cluster expansion and dynamic balancing, the disk 4 may crash due to management of too many data objects 2, and therefore, the PGs 3 are set up to avoid tight coupling between the client and the underlaying disks 4. The disks 4 are usually object storage devices (OSDs) configured to respond to a process that the client requests returning of specific data.

Optionally, the flow of a method for storing a file in the storage system by the client of the distributed storage system is as follows:

a) a distributed storage client first specifying an object name to be stored in a storage pool of the distributed storage system;

b) performing hash calculation on the object name by means of a crushmap algorithm to obtain a specific PG id, the setting of PG num being determined according to the number of OSD disks;

c) after the sliced data objects are stored in the PGs, storing and instantiating the process in the form of directories in the OSD disks;

d) the data objects being stored in the directories of the PGs, and the data objects each consist of three elements, i.e. data, xattr, and omap, wherein the data contained in the three elements stores data of the data object, and the xattr contained in the three elements stores an extended attribute of the data object; a file attribute may be set for each object file, and the attribute is a key/value value, but is limited by a file system, and the number of key/value pairs and the size of each value are both limited; when the key/value of an object to be set cannot be stored in the extended attribute of the file, there is another way to store omap; and omap is stored in a database levelDB of a key/value pair; and e) finally, according to a redundancy policy of the distributed storage system, the data objects in the PGs may be mapped to a plurality of OSD disks, such as three copies; one PG contains three OSD disks, and information of the data objects carried by each OSD disk is completely consistent; and the flow above serves as a basis for the principle of data consistency detection and repair according to some embodiments of the present disclosure.

The OSD disks use a uniform naming space in the distributed storage system, file data of the client is sliced, the size of each data object is specified as a preset value, and detection and repair processing is performed on data objects according to the slice size. Each data object consists of a globally unique inode number (specified hexadecimal), an offset relative to a file, an object type (snapshot snap or non-snapshot), an object Hash value, an id of a storage pool to which the data object belongs, and a number of an OSD. Optionally, an example of a data object stored in an OSD disk is as follows:

10000226acd. 00000002_head_84325100_5, wherein

10000226acd: the inode number of the file, globally unique;

00000002: the offset relative to the file;

head: the object being in a head directory, non-snapshot, and in cases of snapshot, snap;

84325100: the hash value of the object, directory hierarchy id of a folder; and

5: the data pool number pool id.

In some embodiments of the present disclosure, consistency of data is detected on the basis of a distributed storage system, and when it is detected that the data is inconsistent, the data is repaired according to a redundancy mechanism of a copy of the distributed storage system.

Figure 2:
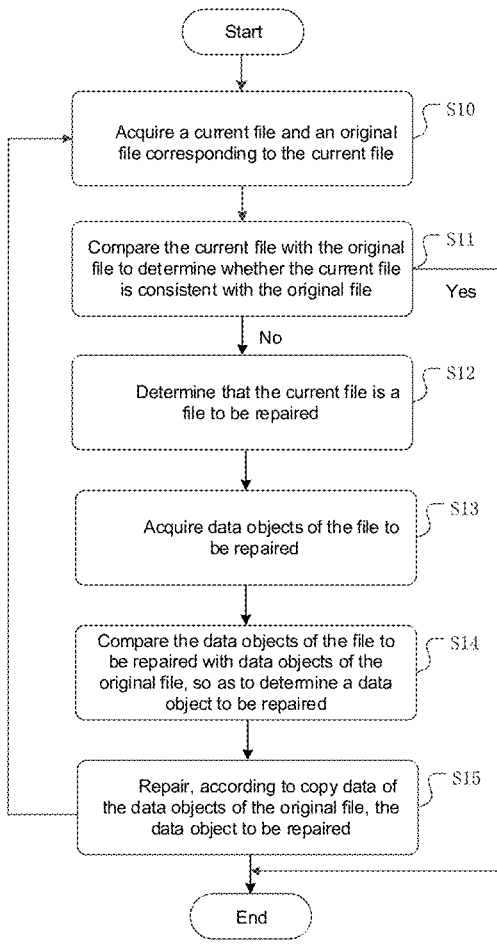
FIG. 2 is a flowchart of a method for data consistency detection and repair provided according to embodiments of the present disclosure.

To make a person skilled in the art better understand the solutions of the present disclosure, hereinafter, some embodiments of the present disclosure are further described in detail with reference to the accompanying drawings and specific embodiments. FIG. 2 is a flowchart of a method for data consistency detection and repair provided according to embodiments of the present disclosure. As shown in FIG. 2, the method contains:

S10: acquiring a current file and an original file corresponding to the current file.

Data consistency detection is to determine whether data is consistent on the basis of comparison between the current file and the original file corresponding to the current file. Therefore, the current file and the original file corresponding to the current file are first acquired respectively. When the two files are acquired, specific contents of the two files, attributes of the files, types of the files, etc. may be acquired respectively. The specific contents acquired for the two files are not limited herein, but the objects acquired for comparison should be consistent, for example, acquiring the attributes of the files for both of the two files. Since the current file and the original file corresponding to the current file are acquired for determining whether data of the two files are consistent, check values of the two files may also be acquired respectively by means of a check tool, so as to determine whether the data of the two files are consistent according to the check values. Currently, a commonly used check tool mainly contains a hash algorithm, an MD5 Message-Digest Algorithm (MD5), etc., and a specific check tool used in some embodiments of the present disclosure is not limited. For example, when whether the data of the two files are consistent is determined according to MD5 values, an MD5 value of the current file and an MD5 value of the original file corresponding to the current file need to be acquired respectively.

S11: comparing the current file with the original file to determine whether the current file is consistent with the original file; when the current file is inconsistent with the original file, proceeding to operation S12; and ending the process when the current file is consistent with the original file.

In the described operation, the current file and the original file corresponding to the current file are acquired, and then whether the data are consistent may be determined according to the current file and the original file corresponding to the current file. The comparison object used to determine whether the data of the two files are consistent is not limited herein. As in the described operation, the determination may be performed according to the specific contents of the two files, and when the specific contents of the two files are completely the same, it is confirmed that the data of the two files are consistent; the determination may also be performed according to both the specific contents of the two files and the attributes of the files, and when the specific contents of the two files are completely the same and the attributes of the files are completely the same, it is confirmed that the data of the two files are consistent; and when the MD5 values of the two files are the same, it is confirmed that the data of the two files are consistent. When the data of the two files are consistent, it indicates that the data is not damaged, and therefore it is unnecessary to repair the data; and when the data of the two files are inconsistent, it indicates that the data is damaged. After the data is damaged, when the data is not repaired, service IO errors may occur and the data may be unavailable, and therefore, when the data is inconsistent, the data needs to be repaired.

S12: determining that the current file is a file to be repaired.

When it is determined that the current file is inconsistent with the original file corresponding to the current file, it is confirmed that the current file is the file to be repaired.

S13: acquiring data objects of the file to be repaired.

In the described operation, the file to be repaired is determined. In implementation, in order to determine a specific position where the data is damaged and accurately repair the damaged data, in this embodiment, the file to be repaired is divided into a plurality of data objects, and it is determined, from the data objects one by one, whether the data has changed. Firstly, a path of a damaged file accessed by a client is confirmed; inode information of the file is found by means of the file path, and is converted into hexadecimal; the size of the file is calculated; and given that the size of each data object is a preset value, the file is segmented, and how many data objects the file has is calculated. Optionally, in the file path, an inode number of the file and the size of the file are obtained by using an 11-i command, a prefix of an underlying data object name is calculated by means of the inode number, and the maximum value of a suffix of the underlying data object name is acquired according to the size of the file. Assuming that inode of the file is 2199080746415, printf "% x\n" 2199080746415 is executed to obtain that the prefix of the underlying data object name is 2000363d3daf, and the size of the file is divided by 4 M to obtain 5129.233, thus the number of data objects obtained is 5130, and when the suffix of the data object name starts from 0, then the range of the suffix is 00000000 to 00001409, wherein 1409 is the hexadecimal of 5129.

S14: comparing the data objects of the file to be repaired with data objects of the original file, so as to determine a data object to be repaired.

In a storage pool, each data object is scanned and traversed, and when "No such file or directory" is used as a flag, when the flag appears, it indicates that the data object has been damaged. For example: an example of a damaged object, inodeID (hexadecimal):

error stat-ing storage pool name/inodeID. object ID: No such file or directory.

When the capacity of a distributed cluster is nearly full, several OSD disks have been fully written many times, and the capacity reaches 100%, the process of the OSD disks may be down and cannot be started. In order to enable the OSD disks to be started without deleting the original data, according to the flow of storing a file in a storage system and the process of storing data objects, files in directories of PGs are migrated, but the movement will lead to the loss of file extension attributes of the data objects in the directories of the PGs, and thus an error occurs when reading the data objects in the directories of the PGs, and it is reported that the data objects do not exist.

S15: repairing, according to copy data of the data objects of the original file, the data object to be repaired, and returning to operation S10.

In order to ensure that no error occurs to the service IO as much as possible and data may be read, the data object to be repaired determined in the described operation is repaired. The distributed storage system records Map information of each PG in different copy data; a copy OSD id of an OSD disk of which a data object is lost may be acquired by means of query; and information of the lost data object may be recovered according to the copy of the OSD disk. Optionally, information of the copy data is acquired first and saved, and then the saved data object information is copied to a corresponding node.

This embodiment provides a method for data consistency detection and repair, comprising: acquiring a current file and an original file corresponding to the current file; comparing the current file with the original file, so as to determine whether the current file is consistent with the original file; determining, when the current file is inconsistent with the original file, that the current file is a file to be repaired; acquiring data objects of the file to be repaired; comparing the data objects of the file to be repaired with data objects of the original file, so as to determine a data object to be repaired; and repairing, according to copy data of the data objects of the original file, the data object to be repaired, and returning to the operation of acquiring the current file and the original file corresponding to the current file; and ending the process when the current file is consistent with the original file. Hence, compared with the current method for implementing data consistency by means of end-to-end data check, in the method according to this embodiment, check information does not need to be attach to the entire IO path during implementation of data consistency, and therefore it is easier to implement data consistency; next, compared with a method for directly dividing files into a plurality of data objects, in the method, it is first determined whether files are consistent, then only a file to be repaired is divided into a plurality of data objects, and files satisfying data consistency do not need to be divided into a plurality of data objects, thereby reducing the time for determining a data object to be repaired, simplifying the process of data consistency detection and repair, and improving the efficiency of data consistency detection and repair.

In implementation, in order to quickly determine whether data of a current file is consistent with that of an original file corresponding to the current file, a check tool is used for determination. In optional embodiments, comparing the current file with the original file to determine whether the current file is consistent with the original file contains:

acquiring a first MD5 value of the original file and acquiring a second MD5 value of the current file; and proceeding, when the first MD5 value is different from the second MD5 value, to the operation of determining that the current file is a file to be repaired.

In the described embodiments, it is listed that whether data of two files are consistent may be determined according to the specific contents of the files, the attributes of the files, the types of the file, etc., or may be determined by using a check tool. When a check tool is used, a check value may be obtained by directly typing file check and integrity verification program information in a command line; therefore, compared with determining data consistency directly according to the specific contents of the files, the attributes of the files and the types of the files, using the check tool is more comprehensive and convenient and fast. The specific check tool used is not limited in this embodiment. Optionally, MD5 values are used for checking data consistency. When calculating an MD5 value of a file, the following command is typed in a command line: FCIV-md5-sha1 path\filename.ext, so that the MD5 value of the file may be obtained. Firstly, an MD5 value of the original file corresponding to the current file is acquired, defining the MD5 value as the first MD5 value; then an MD5 value of the current file is acquired, defining the MD5 value as the second MD5 value; the two MD5 values are compared; when the two MD5 values are the same, it indicates that the data of the two files are consistent; and when the two MD values are different, it indicates that the data of the two files are inconsistent, and it is determined that the current file is a file to be repaired.

In this embodiment, checking data consistency according to the MD5 values may obtain a data consistency result more accurately, comprehensively and quickly.

In order to accurately locate a position where data is damaged, in implementation, a file to be repaired is divided into a plurality of data objects, and a damaged data object is determined by traversing each data object. In optional embodiments, acquiring data objects of the file to be repaired contains:

acquiring the size of the file to be repaired, and setting the size of each of the data objects to be a preset value;

dividing the file to be repaired into a plurality of data objects according to the size of the file to be repaired and the preset value; and acquiring the plurality of data objects of the file to be repaired.

Firstly, a path of a damaged file accessed by a client is confirmed; inode information of the file is found by means of the path file, and is converted into hexadecimal; the size of the file is calculated; and the size of each data object is set to be a preset value, the file is segmented according to the preset value, and how many data objects the file has is calculated. It should be noted that, the setting of the preset value is not limited in some embodiments of the present disclosure. For Ceph distributed storage, the preset value may be 4 MB; for GFS distributed storage, the preset value may be 64 MB; and for HDFS distributed storage, the preset value may be 128 MB. In this embodiment, the preset value is selected as 4 M.

In this embodiment, a file is divided into a plurality of data objects, and a damaged data object is determined by traversing each data object, so that a position where data is damaged is accurately located.

In some embodiments of the present disclosure, data consistency detection and repair is performed on the basis of a distributed storage system. In an optional implementation, storing the original file in a storage pool contains:

dividing the original file into a plurality of data objects and acquiring the data objects of the original file;

setting PGs in the storage pool;

storing the data objects of the original file in the PGs; and mapping the PGs to OSD disks of the storage pool by means of a crushmap algorithm, wherein the OSD disks of the storage pool contain multiple copy data mapped by the PGs.

The process of storing the original file in a storage pool is shown in FIG. 1. The distributed storage system has been described in detail above, and is not repeated herein.

In the distributed storage mode provided in this embodiment, PGs are set up in a storage pool, so that tight coupling between a client and underlying OSD disks may be avoided; in addition, by means of the crushmap algorithm, it may be ensured that data objects are evenly distributed in the OSD disks as much as possible.

In implementation, common cases of data inconsistency contain damage of stored data, loss of a xattr extension attribute, etc. When data inconsistency is caused by xattr extension attribute loss, a specific repair process is as follows. When it is detected that data inconsistency is caused by xattr extension attribute loss, repairing, according to copy data of the data objects of the original file, the data object to be repaired contains:

querying, according to mapping information of the PGs in the OSD disks of the storage pool, a copy number of the data object to be repaired;

acquiring copy data mapped by the PG corresponding to the data object to be repaired, wherein the copy data mapped by the PG is the copy data of the data objects of the original file;

copying the copy data mapped by the PG to a node corresponding to the data object to be repaired;

modifying a header part of an xattr file to the copy number of the data object to be repaired; and restoring the data object to be repaired, so as to complete data repair.

After determining that the data object to be repaired is the lost data object, is determined, the distribution of the data objects is located in the distributed storage system. The distributed storage system records Map information of each PG in different copy data; a copy number, i.e. OSD id, of an OSD disk of which a data object is lost may be acquired by means of query; and information of the lost data object may be recovered according to the copy of the OSD disk. Information of the copy data is acquired first and saved, then the saved object information is copied to a corresponding node, and finally a header part of the attr file is modified and set as the OSD disk number of the data object which is currently lost, and the information of the data object is restored, so to as complete data repair. Optionally, the repair process is as follows:
- a) for an OSD of which an object is lost, listing attribute information of a copy OSD in the same PG;
  attr-1 PG object directory
  /3.3d3_head/
  200036d3db5.00000f7d_head_CEAF8FD3_3
- b) exporting the attribute information of the copy OSD in the same PG;
  getfattr-d PG object directory
  /3.3d3_head/
  200036d3db5.00000f7d_head_CEAF8FD3_3> save file.txt
- c) modifying "save file.txt" and setting same to be the number of the OSD for which object information is currently lost;
- d) copying same to a node to which the OSD of which an object is lost belongs; and
- e) restoring an extension attribute by means of a "setfattr-restore save file.txt" command.

The method for data repair provided in this embodiment solves the problem of data inconsistency caused by xattr extension attribute loss, so that service IO is as correct as possible and data availability is ensured.

On the basis of the described embodiments, in order to implement timing detection of data consistency, in an optional embodiment, after repairing, according to copy data of the data objects of the original file, the data object to be repaired, the method further contains:

setting up an automated repair tool; and
adding the automated repair tool to a backend task.

In implementation, a check tool may be designed by means of a pseudo code and added to a Linux backend crontab task, so as to implement timing detection. The process of implementing detection by means of a pseudo code is as follows: firstly inputting a file path to be repaired, and finding a path of a file to be analyzed; and comparing information of data objects in a storage pool.

In this embodiment, an automated repair tool is set up, and when it is detected that data is inconsistent, the automated repair tool may process the situation of data inconsistency in a timely manner, so that service IO is as correct as possible and data availability is ensured.

In the described embodiments, consistency of data is detected and repaired. In implementation, in order to enable a user to intuitively understand a data repair situation, optionally, after repairing, according to the copy data corresponding to the data object to be repaired, the data object to be repaired, the method further contains:

outputting information for prompting repair completion.

After data repair is completed, prompt information is output to prompt the user that data repair has been completed. In this embodiment, the specific content, manner, time, etc. of information for prompting repair completion are not limited, as long as completion of data repair may be prompted.

In this embodiment, after data repair is completed, prompt information is output, so that a user may intuitively understand a data repair situation.

In the described embodiments, the method for data consistency detection and repair is described in detail. Embodiments corresponding to an apparatus for data consistency detection and repair are further provided in the present disclosure. It should be noted that, in the present disclosure, the embodiments of the apparatus part are described from two perspectives, one is based on the perspective of functional modules, and the other is based on the perspective of hardware.

Figure 3:
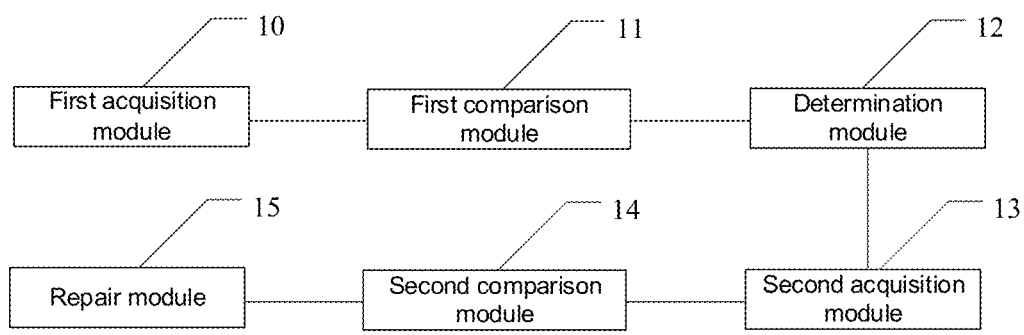
FIG. 3 is a structural diagram of an apparatus for data consistency detection and repair provided according to some embodiments of the present disclosure.

FIG. 3 is a structural diagram of an apparatus for data consistency detection and repair provided according to some embodiments of the present disclosure. This embodiment is based on the perspective of functional modules, comprising:

a first acquisition module 10, configured to acquire a current file and an original file corresponding to the current file;

a first comparison module 11, configured to compare the current file with the original file, so as to determine whether the current file is consistent with the original file; when the current file is inconsistent with the original file, trigger a determination module 12; and when the current file is consistent with the original file, end the process;

the determination module 12, configured to determine that the current file is a file to be repaired;

a second acquisition module 13, configured to acquire data objects of the file to be repaired;

a second comparison module 14, configured to compare the data objects of the file to be repaired with data objects of the original file, so as to determine a data object to be repaired; and a repair module 15, configured to repair, according to copy data of the data objects of the original file, the data object to be repaired, and return to the operation of acquiring the current file and the original file corresponding to the current file.

The embodiments of the apparatus part correspond to the embodiments of the method part; therefore, for the embodiments of the apparatus part, reference may be made to the illustration of the embodiments of the method part, and they will not be repeated herein again.

This embodiment provides an apparatus for data consistency detection and repair, wherein the first acquisition module acquires the current file and the original file corresponding to the current file; the first comparison module compares the current file with the original file, so as to determine whether the current file is consistent with the original file; when the current file is inconsistent with the original file, the determination module is triggered to determine that the current file is the file to be repaired; the second acquisition module acquires data objects of the file to be repaired; the second comparison module compares the data objects of the file to be repaired with data objects of the original file so as to determine the data object to be repaired; and the repair module repairs, according to copy data of the data objects of the original file, the data object to be repaired. Hence, compared with the current method for implementing data consistency by means of end-to-end data check, in the apparatus, check information does not need to be attached to the entire IO path during implementation of data consistency, and therefore it is easier to implement data consistency; next, compared with directly dividing files into a plurality of data objects, in the apparatus, it is first determined whether files are consistent, then only a file to be repaired is divided into a plurality of data objects, and files satisfying data consistency do not need to be divided into a plurality of data objects, thereby reducing the time for determining a data object to be repaired, simplifying the process of data consistency detection and repair, and improving the efficiency of data consistency detection and repair.

Figure 4:
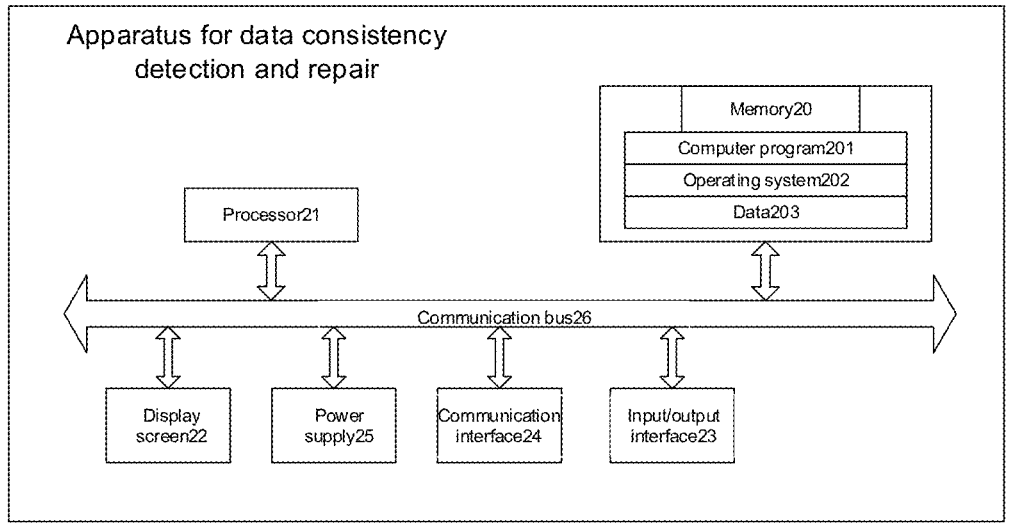
FIG. 4 is a structural diagram of an apparatus for data consistency detection and repair provided according to some other embodiments of the present disclosure.

FIG. 4 is a structural diagram of an apparatus for data consistency detection and repair provided according to some other embodiments of the present disclosure. This embodiment is based on the perspective of hardware, as shown in FIG. 4, the apparatus for data consistency detection and repair contains:

a memory 20, configured to store a computer program; and a processor 21, configured to execute the computer program to implement the operations of the method for data consistency detection and repair provided in the described embodiments.

The apparatus for data consistency detection and repair provided in this embodiment may contain, but is not limited to, a smartphone, a tablet computer, a notebook computer, or a desktop computer.

The processor 21 may contain one or more processing cores, such as a 4-core processor and an 8-core processor. The processor 21 may be implemented in at least one hardware form among a Digital Signal Processor (DSP), a Field-Programmable Gate Array (FPGA), and a Programmable Logic Array (PLA). The processor 21 may further contain a main processor and a coprocessor, wherein the main processor is a processor configured to process data in a wake-up state, and is also referred to as a Central Processing Unit (CPU); and the coprocessor is a low power consumption processor configured to process data in a standby state. In some embodiments, the processor 21 may be integrated with a Graphics Processing Unit (GPU), and the GPU is configured to be responsible for rendering and drawing content required to be displayed on a display screen. In some embodiments, the processor 21 may further contain an Artificial Intelligence (AI) processor configured to handle computing operations related to machine learning.

The memory 20 may contain one or more computer-readable storage media which may be non-transitory. The memory 20 may further contain a high-speed random access memory, and a non-transitory memory, such as one or more disk storage devices and a flash storage device. In this embodiment, the memory 20 is at least configured to store the following computer program 201, wherein the computer program, after being loaded and executed by the processor 21, may implement related operations of the method for data consistency detection and repair disclosed in any one of the described embodiments. In addition, resources stored in the memory 20 may further contain an operating system 202 and data 203, and the storage manner may be temporary storage or permanent storage. The operating system 202 may contain Windows, Unix, and Linux. The data 203 may contain, but is not limited to, data involved in the described method for data consistency detection and repair.

In some embodiments, the apparatus for data consistency detection and repair may further contain a display screen 22, an input/output interface 23, a communication interface 24, a power supply 25, and a communication bus 26.

A person skilled in the art would understand that the structure shown in FIG. 4 does not constitute a limitation to the apparatus for data consistency detection and repair, and may contain more or less components than those shown in the figure.

The apparatus for data consistency detection and repair provided in the embodiments of the present disclosure contains a memory and a processor. When executing a program stored in the memory, the processor may implement the following method: a method for data consistency detection and repair, and the effect is the same as above.

Finally, embodiments corresponding a non-transitory computer-readable storage medium are further provided in the present disclosure. The computer-readable storage medium stores a computer program which, when being executed by a processor, the operations defined in the described method embodiments.

It may be understood that when the method in the described embodiments is implemented in the form of software functional units and sold or used as an independent product, it may be stored in a computer-readable storage medium. On the basis of such understanding, the technical solutions of the present disclosure in nature or the portion contributed to the related art, or all or some of the technical solutions may be embodied in the form of a software product, and the computer software product is stored in a storage medium to execute all or some of the operations of the method described in the embodiments of the present disclosure. Moreover, the described storage medium contains: media such as a USB flash disk, a mobile hard disk, a Read-Only Memory (ROM), a Random Access Memory (RAM), a magnetic disk or an optical disk, which may store program codes.

The computer-readable storage medium provided in some embodiments of the present disclosure contains the described method for data consistency detection and repair, and the effect is the same as above.

Figure 5:
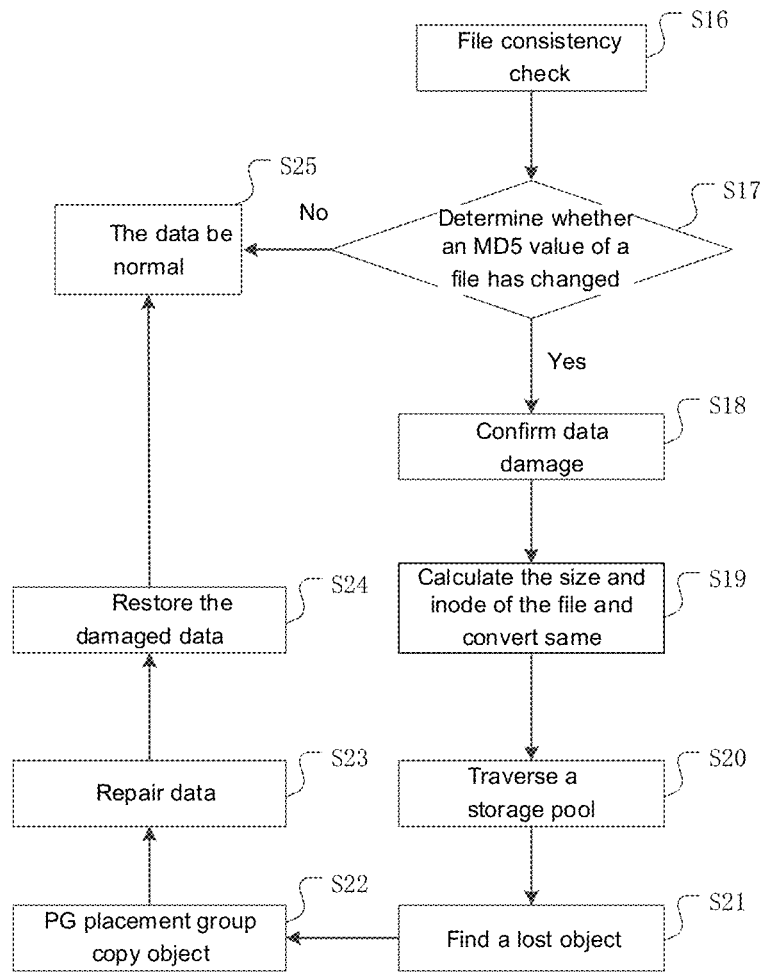
FIG. 5 is a schematic diagram of an application scenario of data consistency detection and repair provided according to embodiments of the present disclosure.

To make a person skilled in the art better understand the solutions of the present disclosure, hereinafter, some embodiments of the present disclosure are further described in detail with reference to FIG. 5. FIG. 5 is a schematic diagram of an application scenario of data consistency detection and repair provided according to embodiments of the present disclosure. As shown in FIG. 5, the process contains:

S16: file consistency check;

S17: determining whether an MD5 value of a file has changed; when the MD5 value of the file has changed, proceeding to operation S18; and when the MD5 value of the file has not changed, proceeding to operation S25;

S18: confirming data damage;

S19: calculating the size and inode of the file and converting same;

S20: traversing a storage pool;

S21: finding a lost object;

S22: PG copy object;

S23: repairing data;

S24: restoring the damaged data; and

S25: the data being normal.

Hence, compared with the current method for implementing data consistency by means of end-to-end data check, in the method for data consistency detection and repair provided in this embodiment, check information does not need to be attached to the entire IO path during implementation of data consistency, and therefore it is easier to implement data consistency; next, compared with directly dividing files into a plurality of data objects, in the method, it is first determined whether files are consistent, then only a file to be repaired is divided into a plurality of data objects, and files satisfying data consistency do not need to be divided into a plurality of data objects, thereby reducing the time for determining a data object to be repaired, simplifying the process of data consistency detection and repair, and improving the efficiency of data consistency detection and repair.

Hereinabove, the method and apparatus for data consistency detection and repair, and the non-transitory computer-readable storage medium provided in some embodiments of the present disclosure are introduced in detail. Various embodiments in the description are described in a progressive manner. Each embodiment focuses on differences from other embodiments. For the same or similar parts between the embodiments, reference may be made to each other. For the apparatuses disclosed in the embodiments, as the apparatuses correspond to the method disclosed in the embodiments, the illustration thereof is relatively simple, and for the related parts, reference may be made to the illustration of the method part. It should be pointed out that for a person of ordinary skill in the technical field, several improvements and refinements may be made without departing from the principle of the present disclosure, and these improvements and refinements shall also fall within the scope of protection of the present disclosure.

It should also be noted that in the present description, relational terms such as first and second are only used to distinguish one entity or operation from another entity or operation, and do not necessarily require or imply any actual relationship or sequence between these entities or operations. Furthermore, the terms "contain", "containing", or any other variations thereof are intended to cover a non-exclusive inclusion, so that a process, a method, an article, or a device that contains a series of elements not only contains those elements, but further contains other elements that are not explicitly listed, or further contains inherent elements of the process, the method, the article, or the device. Without further limitation, an element defined by a sentence "comprising a . . . " does not exclude other same elements existing in the process, the method, the article, or the device that contains the element.

The invention claimed is:

1. A method for data consistency detection and repair, comprising:
   acquiring a current file and an original file corresponding to the current file;
   comparing the current file with the original file, so as to determine whether the current file is consistent with the original file;
   determining, when the current file is inconsistent with the original file, that the current file is a file to be repaired; acquiring data objects of the file to be repaired;
   comparing the data objects of the file to be repaired with data objects of the original file, so as to determine a data object to be repaired; and repairing, according to copy data of the data objects of the original file, the data object to be repaired, and returning to the operation of acquiring the current file and the original file corresponding to the current file; and
   ending the process when the current file is consistent with the original file;
   wherein comparing the current file with the original file, so as to determine whether the current file is consistent with the original file comprises: acquiring a first MD5 value of the original file and acquiring a second MD5 value of the current file; and
   proceeding, when the first MD5 value is different from the second MD5 value, to the operation of determining that the current file is a file to be repaired;
   wherein acquiring data objects of the file to be repaired comprise: acquiring the size of the file to be repaired, and setting the size of each of the data objects to be a preset value; dividing the file to be repaired into a plurality of data objects according to the size of the file to be repaired and the preset value; and acquiring the plurality of data objects of the file to be repaired;
   wherein the method further comprise: storing the original file in a storage pool according to the following operations: dividing the original file into a plurality of data objects and acquiring the data objects of the original file; setting placement groups (PGs) in the storage pool; storing the data objects of the original file in the PGs; and
   mapping the PGs to OSD (Object Storage Devices) disks of the storage pool by means of a crushmap algorithm, wherein the OSD disks of the storage pool comprise multiple copy data mapped by the PGs;
   wherein repairing, when it is detected that data inconsistency is caused by xattr extension attribute loss, according to copy data of the data objects of the original file, the data object to be repaired comprises: querying, according to mapping information of the PGs in the OSD disks of the storage pool, a copy number of the data object to be repaired; acquiring copy data mapped by the PG corresponding to the data object to be repaired, wherein the copy data mapped by the PG is the copy data of the data objects of the original file; copying the copy data mapped by the PG to a node corresponding to the data object to be repaired; modifying a header part of an xattr file to the copy number of the data object to be repaired; and restoring the data object to be repaired, so as to complete data repair.

2. The method for data consistency detection and repair according to claim 1, wherein after repairing, according to copy data of the data objects of the original file, the data object to be repaired, the method further comprises:
   setting up an automated repair tool; and
   adding the automated repair tool to a backend task.

3. The method for data consistency detection and repair according to claim 2, wherein
   setting up the automated repair tool comprises: setting up a check tool designed based on pseudo codes; and
   adding the automated repair tool to a backend task comprises: adding the check tool designed based on pseudo codes to the backend task.

4. The method for data consistency detection and repair according to claim 3, wherein adding the check tool designed based on pseudo codes to the backend task comprises:
   adding the check tool designed based on pseudo codes to a Linux backend crontab task.

5. The method for data consistency detection and repair according to claim 3, wherein a detection process of the check tool designed based on pseudo codes comprises:
   inputting in the check tool designed based on pseudo codes a file path to be repaired, and finding a path of a file to be analyzed; and
   comparing, in a storage pool, information of a data object that is determined on the basis of the path of the file to be analyzed.

6. The method for data consistency detection and repair according to claim 1, wherein after repairing, according to the copy data corresponding to the data object to be repaired, the data object to be repaired, the method further comprises:
   outputting information for prompting repair completion.

7. The method for data consistency detection and repair according to claim 1, wherein comparing the current file with the original file, so as to determine whether the current file is consistent with the original file comprises:
   acquiring information of the original file and acquiring information of the current file, wherein the information of the original file comprises at least one of the following:
content in the original file, the attribute of the original file and the type of the original file;

and the information of the current file comprises at least one of the following: content in the current file, the attribute of the current file and the type of the current file; and correspondingly comparing the information of the original file with the information of the current file, and when it is determined that a comparison result is that the information of the original file is different from the information of the current file, proceeding to the operation of determining that the current file is a file to be repaired.

8. The method for data consistency detection and repair according to claim 1, wherein comparing the current file with the original file, so as to determine whether the current file is consistent with the original file comprises:

acquiring a hash value of the original file and acquiring a hash value of the current file; and proceeding, when the hash value of the original file is different from the hash value of the current file, to the operation of determining that the current file is a file to be repaired.

9. The method for data consistency detection and repair according to claim 1, wherein comparing the data objects of the file to be repaired with the data objects of the original file, so as to determine the data object to be repaired comprises:

comparing the plurality of data objects of the file to be repaired with the data objects of the original file one by one, so as to determine the data object to be repaired.

10. The method for data consistency detection and repair according to claim 1, wherein repairing, according to copy data of the data objects of the original file, the data object to be repaired comprises:

storing the copy data of the data objects of the original file; and copying the copy data stored to a node corresponding to the data object to be repaired.

11. The method for data consistency detection and repair according to claim 1, wherein dividing the file to be repaired into a plurality of data objects according to the size of the file to be repaired and the preset value comprises:

segmenting, according to the size of the file to be repaired and the preset value, the file to be repaired, so as to divide the file to be repaired into the plurality of data objects of the file to be repaired, wherein the preset value corresponding to the file to be repaired which is stored in a different storage format is different.

12. An apparatus for data consistency detection and repair, comprising:

a memory, configured to store a computer program; and
a processor, configured to execute the computer program, and when the computer program is executed by the processor, the processor is configured to perform the following operations:

acquiring a current file and an original file corresponding to the current file;

comparing the current file with the original file, so as to determine whether the current file is consistent with the original file;

determining that the current file is a file to be repaired when the current file is inconsistent with the original file; acquiring data objects of the file to be repaired;

comparing the data objects of the file to be repaired with data objects of the original file, so as to determine a data object to be repaired; and repairing, according to copy data of the data objects of the original file, the data object to be repaired, and returning to the operation of acquiring the current file and the original file corresponding to the current file; and ending the process when the current file is consistent with the original file;

wherein comparing the current file with the original file, so as to determine whether the current file is consistent with the original file comprises: acquiring a first MD5 value of the original file and acquiring a second MD5 value of the current file; and proceeding, when the first MD5 value is different from the second MD5 value, to the operation of determining that the current file is a file to be repaired;

wherein acquiring data objects of the file to be repaired comprise: acquiring the size of the file to be repaired, and setting the size of each of the data objects to be a preset value; dividing the file to be repaired into a plurality of data objects according to the size of the file to be repaired and the preset value; and acquiring the plurality of data objects of the file to be repaired;

wherein the processor is further configured to perform the following operations:

storing the original file in a storage pool according to the following operations: dividing the original file into a plurality of data objects and acquiring the data objects of the original file; setting placement groups (PGs) in the storage pool; storing the data objects of the original file in the PGs; and mapping the PGs to OSD disks of the storage pool by means of a crushmap algorithm, wherein the OSD disks of the storage pool comprise multiple copy data mapped by the PGs;

wherein repairing, when it is detected that data inconsistency is caused by xattr extension attribute loss, according to copy data of the data objects of the original file, the data object to be repaired comprises: querying, according to mapping information of the PGs in the OSD disks of the storage pool, a copy number of the data object to be repaired; acquiring copy data mapped by the PG corresponding to the data object to be repaired, wherein the copy data mapped by the PG is the copy data of the data objects of the original file; copying the copy data mapped by the PG to a node corresponding to the data object to be repaired; modifying a header part of an xattr file to the copy number of the data object to be repaired; and restoring the data object to be repaired, so as to complete data repair.

13. The apparatus for data consistency detection and repair according to claim 12, further comprising:

a display screen, an input/output interface, a communication interface, a power supply and a communication bus, wherein the memory, the processor, the display screen, the input/output interface, the communication interface and the power supply are all connected to the communication bus.

14. A non-transitory computer-readable storage medium, wherein the computer-readable storage medium stores a computer program which, when being executed by a processor, implements the following operations:

acquire a current file and an original file corresponding to the current file;

compare the current file with the original file, so as to determine whether the current file is consistent with the original file;

determine that the current file is a file to be repaired when the current file is inconsistent with the original file; acquire data objects of the file to be repaired; compare the data objects of the file to be repaired with data objects of the original file, so as to determine a data object to be repaired; and repair, according to copy data of the data objects of the original file, the data object to be repaired, and returning to the operation of acquiring the current file and the original file corresponding to the current file; and end the process when the current file is consistent with the original file;

wherein comparing the current file with the original file, so as to determine whether the current file is consistent with the original file comprises: acquiring a first MD5 value of the original file and acquiring a second MD5 value of the current file; and proceeding, when the first MD5 value is different from the second MD5 value, to the operation of determining that the current file is a file to be repaired;

wherein acquiring data objects of the file to be repaired comprise: acquiring the size of the file to be repaired, and setting the size of each of the data objects to be a preset value; dividing the file to be repaired into a plurality of data objects according to the size of the file to be repaired and the preset value; and acquiring the plurality of data objects of the file to be repaired;

wherein the computer program further implements the following operations:

storing the original file in a storage pool according to the following operations: dividing the original file into a plurality of data objects and acquiring the data objects of the original file; setting placement groups (PGs) in the storage pool; storing the data objects of the original file in the PGs; and mapping the PGs to OSD disks of the storage pool by means of a crushmap algorithm, wherein the OSD disks of the storage pool comprise multiple copy data mapped by the PGs;

wherein repairing, when it is detected that data inconsistency is caused by xattr extension attribute loss, according to copy data of the data objects of the original file, the data object to be repaired comprises: querying, according to mapping information of the PGs in the OSD disks of the storage pool, a copy number of the data object to be repaired; acquiring copy data mapped by the PG corresponding to the data object to be repaired, wherein the copy data mapped by the PG is the copy data of the data objects of the original file; copying the copy data mapped by the PG to a node corresponding to the data object to be repaired; modifying a header part of an xattr file to the copy number of the data object to be repaired; and restoring the data object to be repaired, so as to complete data repair.

* * * * *